(12) United States Patent
Sparr et al.

(10) Patent No.: US 7,139,430 B2
(45) Date of Patent: Nov. 21, 2006

(54) CHARACTER RECOGNITION

(75) Inventors: Gunnar Sparr, Lund (SE); Rikard Berthilsson, Lund (SE)

(73) Assignee: Zi Decuma AB, Lund (SE)

( * ) Notice: Subject to any disclaimer, the term of this patent is extended or adjusted under 35 U.S.C. 154(b) by 429 days.

(21) Appl. No.: 10/795,245

(22) Filed: Mar. 9, 2004

(65) Prior Publication Data

US 2004/0234129 A1    Nov. 25, 2004

Related U.S. Application Data

(63) Continuation of application No. 09/764,341, filed on Jan. 19, 2001, now Pat. No. 6,711,290, which is a continuation of application No. PCT/SE99/01448, filed on Aug. 25, 1999.

(30) Foreign Application Priority Data

Aug. 26, 1998 (SE) .................................. 9802832

(51) Int. Cl.
*G06K 9/46* (2006.01)
*G06K 9/68* (2006.01)

(52) U.S. Cl. .............. 382/186; 382/189; 382/203; 382/216; 382/218

(58) Field of Classification Search .............. 382/119, 382/123, 186–189, 200–203, 216–218, 242
See application file for complete search history.

(56) References Cited

U.S. PATENT DOCUMENTS

| | | | |
|---|---|---|---|
| 3,614,736 A | 10/1971 | McLaughlin et al. | |
| 3,636,513 A | 1/1972 | Tisdale | |
| 4,718,103 A | 1/1988 | Shojima et al. | |
| 5,333,209 A | 7/1994 | Sinden et al. | |
| 5,481,625 A | 1/1996 | Suzuki | |
| 5,537,489 A | 7/1996 | Sinden et al. | |
| 5,559,897 A | 9/1996 | Brown et al. | |
| 5,610,996 A | 3/1997 | Eller | |
| 5,710,916 A | 1/1998 | Barbara et al. | |
| 5,745,599 A | 4/1998 | Uchiyama et al. | |
| 5,768,420 A | 6/1998 | Brown et al. | |
| 5,889,889 A | 3/1999 | Sinden | |
| 6,044,174 A | 3/2000 | Sinden | |

(Continued)

FOREIGN PATENT DOCUMENTS

EP    0 782 090 A2    12/1996

(Continued)

OTHER PUBLICATIONS

Berthilsson, R., "Extension of Affine Shape," Technical Report, Department of Mathematics, Lund Institute of Technology 1997.

(Continued)

*Primary Examiner*—Vikkram Bali
(74) *Attorney, Agent, or Firm*—Browdy and Neimark, PLLC

(57) ABSTRACT

Character recognition includes detecting a union of characters, preprocessing the union of characters, comparing the preprocessed union of characters with one or more template symbols, and applying a decision rule to either reject a template symbol or decide that the template symbol is included in the union of characters. Such preprocessing involves representing the union of characters as one or more curves, and parameterizing the curve(s); and, regarding various classes of transformation, forming one or more shapes for the curve(s). The comparing operation involves forming one or more geometric proximity measures, and determining for every shape the values of those measures between the shape and correspondingly determined shapes for the template symbols. Applying a decision rule involves selecting one or more template symbols in consideration of the values.

21 Claims, 3 Drawing Sheets

U.S. PATENT DOCUMENTS 6,208,757 B1  3/2001  Sinden
6,711,290 B1 *  3/2004  Sparr et al. .................. 382/186

FOREIGN PATENT DOCUMENTS

WO   WO 94/04992   3/1994
WO   WO 97/20286   6/1997

OTHER PUBLICATIONS

Sparr, G., "Depth Computations from Polyhedral Images," Image and Vision Computing, 17 (1992), 683-688.

Sparr, G., "On the 'reconstruction' of Impossible object," Proceedings Swedish Symposium on Image Analysis, Uppsala, 1992.

Subrahmonia et al, "Recognizing Mice, Vegetables and Hand Printed Characters Based on Implicit Polynomials, Invariants and Bayesian Methods". Proc. of Fourth International Conference on Computer Vision, May 1993, pp. 320-324.

Tappert et al, "The State of the Arrt in One-Line Handwriting Recognition" IEEE Transactions on Pattern Anaylsis and Machine Inteligence, vol. 12, No. 8, Aug. 1990, pp. 787-808.

* cited by examiner

CHARACTER RECOGNITION

RELATED APPLICATIONS

This is a continuation of copending parent application Ser. No. 09/764,341, filed Jan. 19, 2001, itself a continuation of international application PCT/SE99/01448, filed Aug. 25, 1999, which designated the United States and was published under PCT Article 21(2) in English.

TECHNICAL FIELD

The present invention relates to a method for character recognition. "Character" is in this compound neutral regarding number, i.e. separate characters, such as letters and numerals, as well as compositions of several characters, such as words, are here referred to. Both generally used characters and imaginary characters are, of course, included.

BACKGROUND ART

There are a plurality of known methods for character recognition, especially for recognition of handwritten characters, which requires especially good interpretation of the character. Several of the known methods are based on the detection of each stroke of the pen when a handwritten character is being formed. Geometric characteristics, such as directions, inclinations and angles of each stroke or part of a stroke, are determined and compared to corresponding data for stored, known characters. The written character is supposed to be the stored character whose geometric characteristics best correspond to the geometric characteristics of the written character. The geometric characteristics are related to an xy-coordinate system, which covers the used writing surface. Such known methods are disclosed in, for instance, U.S. Pat. No. 5,481,625 and U.S. Pat. No. 5,710,916. A problem in such methods is that they are sensitive to rotation. For example, if one writes diagonally over the writing surface, the method has difficult ties in correctly determining what characters are being written.

U.S. Pat. No. 5,537,489 discloses a method for preprocessing the characters by normalizing them. The written character is sampled, and each sample is represented as a pair of coordinates. Instead of solely comparing the characters in the coordinate plane, the transformation is determined which best adjusts the written character to a model character. Indirectly, also rotation and certain types of deformations, which the above-mentioned methods cannot handle, are thus taken into account. The transformation is used to normalize the written character. In particular, the character is normalized by being translated so that its central point is in the origin of coordinates, where also the central point of the model character is found, after which the character is scaled and rotated in such a manner that it corresponds to the model character in the best possible way. A disadvantage of this method is that the normalization requires computing power and that in any case the choice of model characters has to take place by determining what model character the written character resembles the most.

Another method which certainly can handle rotations is disclosed in U.S. Pat. No. 5,768,420. In this known method, curve recognition is described by means of a ratio that is named "ratio of tangents". A curve, for instance, a portion of a character is mapped by selecting a sequence of pairs of points along the curve, where the tangents in the two points of each pair intersect at a certain angle. The ratio between the distances from the intersection point to the respective points of the pair is calculated and makes up an identification of the curve. This method is in principle not sensitive to translation, scaling and rotation. However, it is limited in many respects. Above all, it does not allow certain curve shapes in which there are not two points whose tangents intersect at the determined angle. It is common that at least portions of a character comprise such indeterminable curve shapes for a selected intersection angle. This reduces the reliability of the method.

SUMMARY OF THE INVENTION

An object of the invention is to provide a method for character recognition, which does not have the above-mentioned disadvantages, and which to a larger extent accepts individual styles of handwritten characters and unusual fonts of typewritten characters, and is easy to implement with limited computing power.

The object is achieved by a character recognition method according to the invention comprising the steps of: detecting a union of characters, preprocessing the union of characters, comparing the preprocessed union of characters with one or more template symbols, and applying a decision rule in order to either reject a template symbol or decide that the template symbol is included in the union of characters, the step of preprocessing the union of characters comprising the steps of: representing the union of characters as one or more curves, and parameterising the curve or curves, characterised in that the step of preprocessing the union of characters further comprises the step of forming, regarding various classes of transformation, one or more shapes for the curve or curves, and that the step of comparing comprises the steps of: forming one or more geometric proximity measures, determining for every shape the values of the geometric proximity measures between the shape and correspondingly determined shapes for the template symbols, and that the step of applying a decision rule comprises the step of: selecting one or more template symbols in consideration of the values.

According to the invention, the term "template symbol" means, as defined in the claim, everything from a portion of a separate character, the portion being, for instance, an arc or a partial stroke and the character being a letter or a numeral, to compound words or other complex characters. In a similar way, the term "union of characters" means everything from a separate character to compositions of several characters. The extension of the mentioned terms will be evident from the following description of embodiments.

BRIEF DESCRIPTION OF THE DRAWINGS

The invention and further advantages thereof will be described in more detail below by way of embodiments referring to the accompanying drawings, in which.

DESCRIPTION OF EMBODIMENTS

Figure 1:
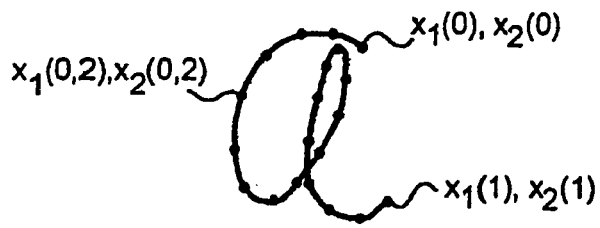
FIG. 1 shows an example of a union of characters which comprises a handwritten character, and which illustrates some steps in a preferred embodiment of the method according to the invention.

According to the invention, the method for character recognition comprises a number of main steps:
a) a union of characters is detected,
b) the union of characters is preprocessed,
c) the preprocessed union of characters is compared with one or more template symbols, and
d) a decision rule is applied in order to determine whether or not any one of the template symbols is included in the union of characters.

According to a preferred embodiment, the various main steps are carried out in accordance with the following description. The embodiment is preferably intended for recognizing unions of characters that are written on a pressure-sensitive display, which is available on the market. It should be noted that the invention is just as useful for recognizing typewritten as handwritten unions of characters that originate from a hard copy, which for instance is scanned into a computer. An embodiment which is particularly adapted to recognition of typewritten, scanned unions of characters will be described below. In the following description of the steps of this embodiment, it will for the sake of simplicity be presumed that the union of characters comprises one character.

In step a), points on the character are detected at regular time intervals at the same time as the character is being written on the pressure-sensitive display. Thus, an ordered sequence of points is obtained. In step b), the following operations are carried out. By interpolation between the points, a curve representation of the character is generated. The curve representation comprises one or more curves which pass through the sequence of points. Any lifting of the pen is detected to prevent the interpolation from extending over spaces between points where the pen has been lifted. The interpolation results in characters such as "t", "ä" and "s" being considered to consist of one or more curves. Each curve or composition of curves is perceived holistically as an indivisible geometric unit. This means, for instance, that the method according to the invention in many ways operates on complete characters (global character interpretation). Each point is represented as two coordinates, which indicate the position of the point in the limited plane that the display constitutes. One of the coordinates which in the following will be called x1 indicates the position laterally and the second, which will be named x2 below indicates the position in the vertical direction. The curve is conveniently parameterized as $\phi(t)=(\phi_1(t), \phi_2(t))$, a t b, where, for the sake of simplicity, a=0 and b=1 and are sampled in a number n of points $t_1 < t_2 \ldots < t_n$ according to any suitable parameterization rule. To begin with, arc length is the rule according to which the parameterization is preferably carried out, which means that the points become equidistantly located. It is to be noted that because of the irregular speed of motion of the writer, this is not the case with the initial coordinate samples. The use of the arc length can be seen as a standardization of the parameterization, which facilitates the following comparison with template symbols, which are parameterized and sampled in a corresponding manner. For some classes of transformation it may be necessary to reparameterize, which will also be described below.

Figure 2A:
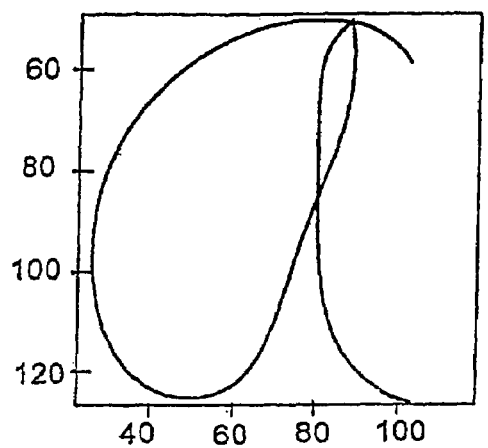
FIGS. 2a–2d and 3a–3d show examples of various transformations of a union of characters which comprises a hand-written character.
Figure 2B:
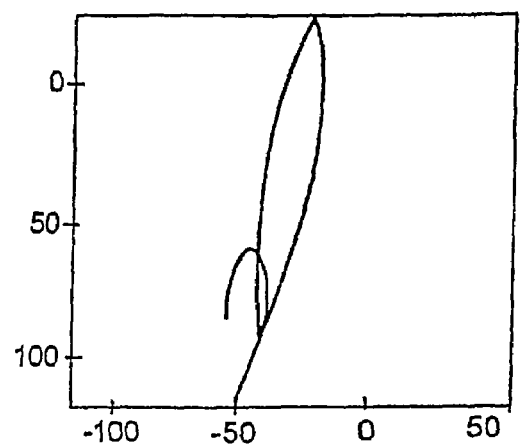
Figure 2C:
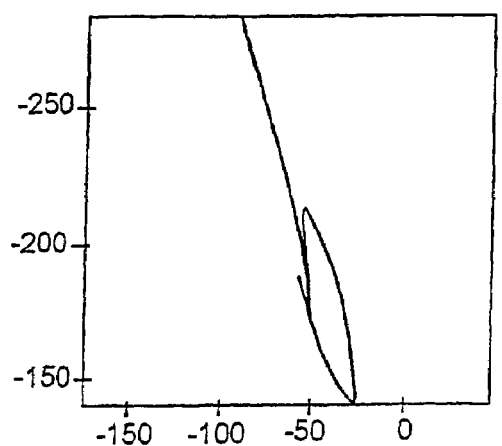
Figure 2D:
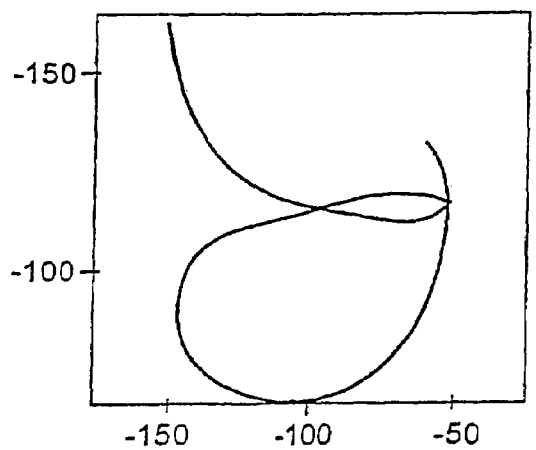
Figure 3A:
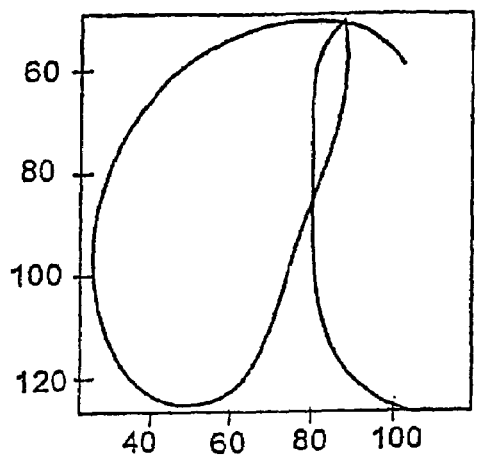
Figure 3B:
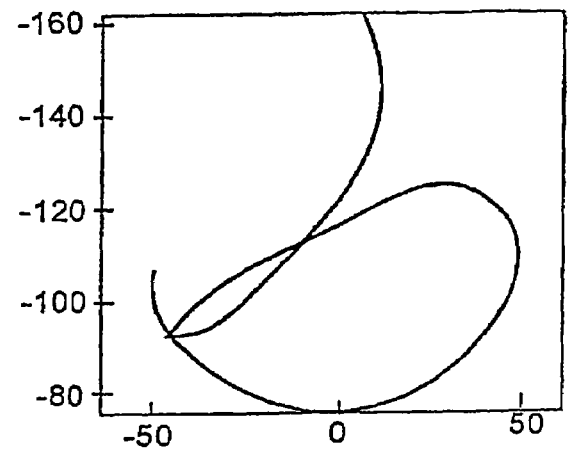
Figure 3C:
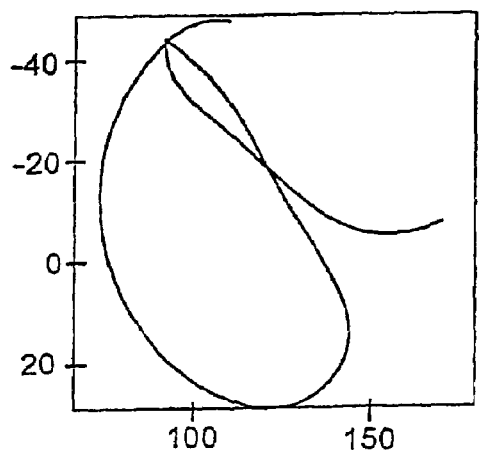
Figure 3D:
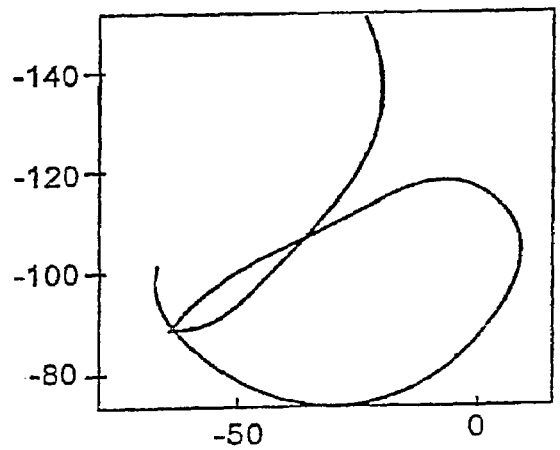

In order to compare the character with template symbols it is necessary to shape a representation which allows quantitative comparisons. Some deviations from a template symbol defined in advance have to be allowed, i.e. for instance an "a" has to be interpreted as an "a", even if with respect to its shape, it differs to a certain extent from the template symbol. According to the invention, a definition is applied that is based on different transformations. Depending on demands for flexibility and exactness, various classes of transformations may be allowed, the classes comprising one or more types of transformation such as translation, rotation, scaling, shearing and reflection. This is illustrated in FIGS. 2a–2d and 3a–3d. FIG. 2a shows a handwritten "a". The other three characters have been subjected to various affine transformations. The class of transformation which is comprised by the affine transformations allows rotation, shearing, reflection, scaling and translation. The characters in FIGS. 2b and 2c have been subjected to translation, rotation, scaling and shearing in relation to the character in FIG. 2a. The character in FIG. 2d has been subjected to translation, reflection, rotation and scaling.

FIGS. 3a–3d illustrate positive similarity transformations that only comprise scaling, rotation and translation. In accordance with this embodiment of the method according to the invention, permissible deviations are limited to positive similarity transformations. This means that a written character or part of a character, which by a suitable combination of scaling, rotation and translation can be brought into correspondence with a template symbol, is interpreted as the same character or part of the character which is represented by the template symbol. The correspondence does not have to be complete, which will be described below.

The representation, which according to this invention is to be preferred, is provided by forming an invariant of the parameterized curve. Useful invariants should according to the invention allow an interpretation that is close to the interpretation a human being makes of a particular character. This means that characters which a human being with great accuracy of aim is able to interpret correctly, i.e. interpret as the characters which the writer says that he or she has written, should be interpreted correctly and with great accuracy of aim by the method according to the invention. It is thus important that a constructed invariant is selective in a well-balanced way. According to the invention, invariants are therefore constructed on the basis of the following definition. If $\phi$ is a parameterized curve according to the above, and G is a group of transformations of curves, then the union is named $d(\phi)=\{\psi|\psi=g(\phi), g \in G\}$ and equivalent rewritings thereof are called the shape of $\phi$. It will be appreciated by those skilled in the art that the definition allows many possible invariants, which, however, all have in common that they handle the curve as the above-mentioned indivisible unit.

According to the preferred embodiment of the invention, the shape corresponding to the group of positive similarity transformations is given by $s(\phi)=\text{linhull}(\{(\phi_1, \phi_2), (-\phi_2, \phi_1), (1, 0), (0, 1)\})$, i.e. a linear space constructed from the parameterised curve $\phi$. As will be appreciated by those skilled in the art, $s(\phi)$ is precisely an equivalent paraphrase of $d(\phi)$. In practice, the use of this shape implies, That all parameterized curves, which can be transformed into each other by positive similarity transformations, have the same linear space as shape.

On the contrary, according to another embodiment of the invention, affine transformations are permissible. Then the shape, after rewriting, is given by $s(\phi)=\text{linhull}(\phi_1, \phi_2, 1)$ which is described in more detail in, for instance, "Extension of affine shape", Technical report, Dept. of Mathematics, Lund Institute of Technology 1997, by R. Berthilsson.

In step c), the shape of the written character is compared with correspondingly formed shapes for a number of template symbols. In this embodiment of the invention, the template symbols are by way of introduction provided by letting a user write by hand on the display all the characters that he or she might need, one at a time, which are processed in accordance with the above-described steps a) and b) and are stored as template symbols. As mentioned above, each template symbol comprises one or more curves, which represent a portion of a character or the complete character, which in practice means hat several template symbols may be required to build a character. However, as will be further developed below, a template symbol can, on the contrary, also represent a sequence of several characters.

According to the invention, one way to compare the shapes is to use a geometric measure of proximity. For the above formed shapes according to the preferred embodiment and the alternative embodiment, respectively, a geometric proximity measure $\mu$ for shapes, which comprise linear sub-spaces within the space of possible parameterized curves S, may be used. An example of such a geometric proximity measure is:

$$\mu = \|(I - P_{s(\phi)} P_{s(\psi)})\|_{HS}$$

where HS represents the Hilbert-Schmidt norm and I is the identity.

In the definition, $s(\phi)$ and $s(\psi)$ represent such linear sub-spaces. $P_{s(\phi)}$ and $P_{s(\psi)}$ further represent orthogonal projections onto $s(\phi)$ and $s(\psi)$, respectively. HS represents the Hilbert-Schmidt norm and I is the identity. The calculation of the geometric proximity measure $\mu$ includes selecting a scalar product.

A general example of a scalar product of two functions $\phi(t)$ and $\psi(t)$ with values in $5^n$ is:

$$\sum_{k=0}^{1} \int \frac{d^k \phi(t)}{dt^k} \cdot \frac{d^k \psi(t)}{dt^k} dm_k$$

where $dm_k$ are positive Radon measures and $\cdot$ represents the scalar product on $5^n$.

Since each sampled curve comprises a plurality of points, each with two coordinates, it is convenient to use matrix notation for comparative processing of the shapes. The steps of describing the curves in matrix notation and constructing a geometric proximity measure can be described and carried out mathematically as follows.

Let us name the curve of the detected character $\psi(t) = (\psi_1(t), \psi_2(t))$, $0 \le t \le 1$, and the curve of a template symbol $\phi(t) = (\phi_1(t), \phi_2(t))$, $0 \le t \le 1$. By sampling the curve at the points of time $0 = t_1 < t_2 \ldots < t_n = 1$, the following matrices may be formed $$M_1 = \begin{bmatrix} \phi_1(t_1) & -\phi_2(t_1) & 1 & 0 \\ \phi_1(t_2) & -\phi_2(t_2) & 1 & 0 \\ \vdots & \vdots & \vdots & \vdots \\ \phi_1(t_n) & -\phi_2(t_n) & 1 & 0 \\ \phi_2(t_1) & \phi_1(t_1) & 0 & 1 \\ \phi_2(t_2) & \phi_1(t_2) & 0 & 1 \\ \vdots & \vdots & \vdots & \vdots \\ \phi_2(t_n) & \phi_1(t_1) & 0 & 1 \end{bmatrix} \quad M_2 = \begin{bmatrix} \psi_1(t_1) & -\psi_2(t_1) & 1 & 0 \\ \psi_1(t_2) & -\psi_2(t_2) & 1 & 0 \\ \vdots & \vdots & \vdots & \vdots \\ \psi_1(t_n) & -\psi_2(t_n) & 1 & 0 \\ \psi_2(t_1) & \psi_1(t_1) & 0 & 1 \\ \psi_2(t_2) & \psi_1(t_2) & 0 & 1 \\ \vdots & \vdots & \vdots & \vdots \\ \psi_2(t_n) & \psi_1(t_n) & 0 & 1 \end{bmatrix}$$

The matrices are QR-factorized in a manner known to those skilled in the art, such that $M_1 = Q_1 R_1$ and $M_2 = Q_2 R_2$, where $Q_1$ and $Q_2$ are orthogonal matrices and $R_1$ and $R_2$ are upper triangular. The matrices $Q_1$ and $Q_2$ represent the shapes of the detected character and the template symbol, respectively, given the parameterizations and the sampling.

A geometric proximity measure $\mu$ may be constructed as follows $$\mu(Q_1, Q_2) = \|Q_2 - Q_1 Q_1^T Q_2\|_F^2$$

where the norm $\|\cdot\|_F$ denotes the Frobenius norm. When $1=0$ and $dm_0$ is the usual Lebesgue measure on the interval $[0, 1]$, in the above general example of a scalar product, exactly this geometric proximity measure is obtained. The choice of scalar product affects the performance of the method.

After the determination of the values of the proximity measure between the shape of the detected character and the shapes of all or a sub-union of the template symbols, step d) is carried out. In this step, each value is compared with an individual acceptance limit which is defined for each template symbol. The template symbols whose values of the proximity measure are smaller than their respective acceptance limits are considered plausible interpretations of the written character. Of these plausible interpretations, the template symbol is selected whose value is the smallest. On the contrary, if no value is smaller than its acceptance limit, a refined determination is made. The acceptance limits may also be one and the same for all of the template symbols. An advantage of using individual acceptance limits is that more complicated characters, such as "@", tend to have a fairly high value of the proximity measure also in case of correspondence, while simpler characters, such as "1", generally have a low value of the proximity measure in case of correspondence. Further variants are possible, some of which will be described below.

Theoretically, the proximity measure has to fulfill $\mu(s(\phi), s(\psi)) = 0$ when $\phi$ and $\psi$ are parameterizations of the same curve when the curves are obtained from each other with a positive similarity transformation. Since people when writing do not exactly stick to the permissible similarity transformations of the template symbols, the acceptance limits should, however, be selected to be greater than zero.

On the one hand, the acceptance limits are therefore determined to be values which are >0, and on the other hand the case where no value is smaller than its acceptance limit is not interpreted as if the written character does not have an equivalent among the template symbols. Instead, according to this embodiment a reparameterization is carried out, since the parameterization affects the final result to a fairly large extent. A preferred reparameterization of the curve $\psi$ means that it is put together with a one-to-one function $\gamma:[0, 1] \to [0, 1]$. For instance $\gamma:(t) = 1-t$ fulfils this, which means that the character is written in the opposite direction. What sort of reparameterization has to be done is determined by solving the problem of minimization $$\min_{\gamma} \mu(s(\phi), s(\psi \circ \gamma))$$

where the minimization is performed over all of the which have been described above.

The above-described steps are then repeated and new values of the proximity measure are obtained. If none of these is below its acceptance limit, the written character is rejected and the user is informed about this, for instance by requesting him or her to rewrite the character. If one wishes to speed up the determination of the proximity measure after the reparameterization, a group consisting of the smallest, for example the three smallest, values of the proximity measures from the first determination can be selected and in the second determination, only be compared with the template symbols that are included in the group. However, in certain cases this may produce a final result other than in the case where all the template symbols are taken into consideration in the second determination.

The geometric proximity measure y does not only result in a ranking order between different interpretations of a character, but it also gives a measure of how similar two characters are. This yields the possibility of also using the present method for verification and identification, respectively, of signatures (initials are here perceived as signatures). In this use, the arc-length parameterization is, however, not a preferred type of parameterization since it excludes information of the dynamics when writing. Such information is valuable in this use. There are, however, other variants that are more suitable.

The preferred embodiment has hitherto been described on the basis of the fact that there are suitable template symbols with which the written character can be compared. Furthermore, the description has been made for one character. Normally, it is not separate characters, but running text with complete words that are written on the display. From the user's point of view, it is desirable to be able to write running text, which demands much of the method.

A problem in the context is that the union of characters may contain a plurality of character combinations. It is unreasonable to ask the user to write all possible characters or words as template symbols.

At the same time, it is advantageous if a limitation of the shapes of the writing can be avoided. If the user were strictly limited, for instance, only allowed to write one character at a time so that the above-described case always exists, the situation is relatively clear, but not user friendly. According to the invention, the user is allowed to write running text. It is thus difficult to know where in the curve/curves, for instance, a character ends and starts. The points indicating the beginning and the end of a character are named breakpoints, and finding possible breakpoints adds complexity to the problem of recognition. This problem of complexity is solved in accordance with an embodiment of the method according to the invention in the following manner. It should be mentioned that the above steps are carried out in the same way in this embodiment. The following description essentially concerns the step of preprocessing the union of characters and the step of comparing.

If the pen is lifted after each character in a word, this may be taken advantage of. Each lifting of the pen gives rise to a discontinuity and may be detected by two points being relatively far apart in space or time. Naturally, this detection is carried out before the arc length parameterization. The union of characters here consists of n curves. The points of discontinuity may be taken as plausible breakpoints to distinguish two characters from one another. This focuses on the problem of characters containing several strokes that are being written by lifting the pen in between. Such a character will be represented by several curves by means of the detection of discontinuity. However, each curve may be parameterized with rescaled arch-length, which means that each curve contains the same number of sampling points. Assume that $l_1, l_2, \ldots, l_n$ are the curves and that $S_k$ is a composition of the curves l to k. Compare the compositions of curves $s_1, s_2, \ldots, s_k$ with the database of template symbols, where k is the largest number of curves included in any template symbol. Assume that $s_{k1}$ is the longest composition of curves which gives correspondence/correspondences, i.e. which, when comparing with template symbols, gives one or more values of proximity measures that are below the acceptance limit/acceptance limits. Even if $s_{k1}$ corresponds to one or more template symbols, it is not certain that this gives a correct interpretation. In accordance with this embodiment of the method, a plausibility test is therefore carried out, which will be described below. If the interpretation is not plausible, $s_{k1}$ is shortened to the longest composition of curves $s_{k2}$ but one, which gives correspondence. The plausibility test is carried out once more.

If no interpretation is plausible for any $s_k$, the best interpretation of $s_1$ is selected. The remaining curves are processed correspondingly. Only the points of discontinuity are not sufficient as plausible breakpoints as far as coherent writing is concerned, but there may also be breakpoints within a curve. It is to be noted that as a matter of fact the above procedure to find breakpoints is achieved with reparameterizations of the composition of all written curves.

The term "plausibility tests" covers, inter alia, so-called confidence sets. The above reasoning of the recognition of unions of characters consisting of several characters, and characters consisting of several curves, respectively, will now be exemplified by means of FIG. 4a–4d, the confidence sets being used as plausibility tests.

Figure 4A:
FIGS. 4a–4d show an example of recognition of a union of characters which comprises several characters.
Figure 4B:
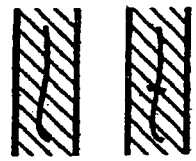
Figure 4C:
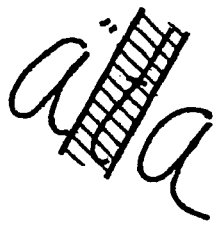
Figure 4D:
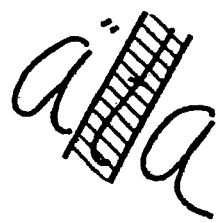
Figure 5:
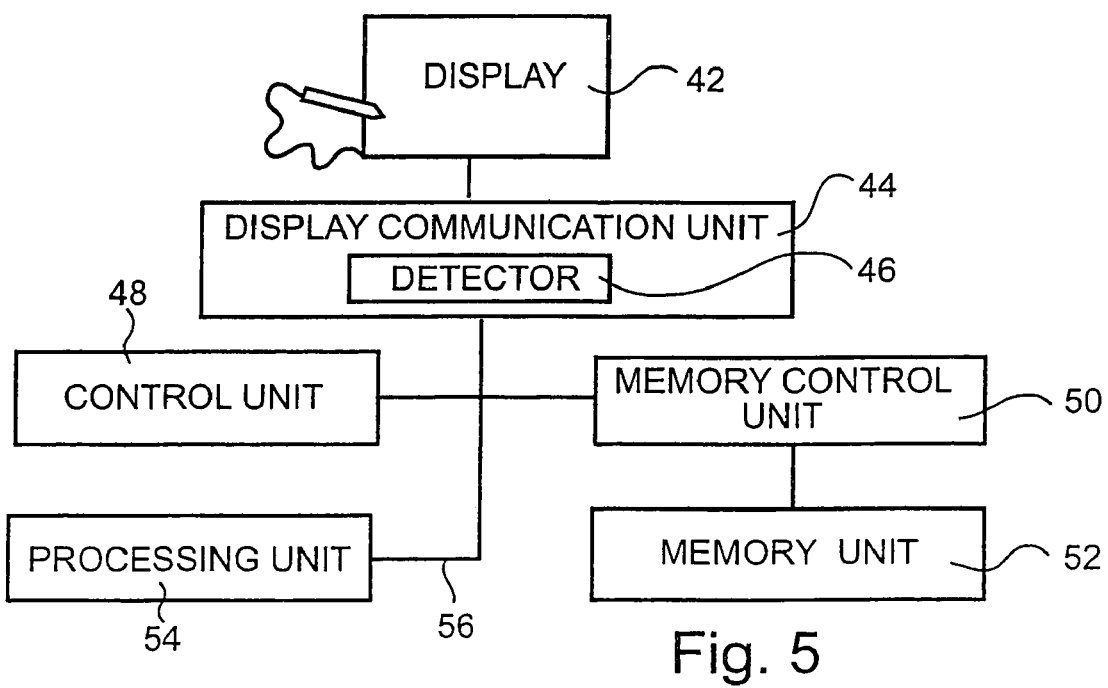
FIG. 5 shows an embodiment of a device for carrying out the method.

Assume that the written character is "ata" (English "eat"), i.e. a complete word written in accordance with FIG. 4a. By means of detection of discontinuities and reparameterization with rescaled arch length, "ä" has been identified and "t" is the next in turn. The horizontal as well as the vertical stroke can be interpreted as an "l", i.e. "t" can be interpreted as "ll". The template symbols are stored with associated confidence sets according to FIG. 4b, where the template symbols "l" and "t" are shown with the respective confidence sets as the shaded area. Assume that the vertical stroke of "t" is interpreted as the template symbol "l". The transformation $a:5^2 \, 5^2$ may then be determined—within the class that generates the shape—which transfers the template symbol in the vertical stroke. If α is applied to the confidence set, the result of FIG. 4c is achieved. The next curve, i.e. the horizontal stroke, is in the confidence set, which is forbidden, and the interpretation is classified as implausible. The confidence sets do not need to be identified by only straight strokes, as those skilled in the art will realize, but may have a more general appearance. To each template symbol another confidence set can be connected which contains the first set. If then the next curve is also outside the second confidence set, it will be interpreted as if the next character is the first one in a new word.

An alternative plausibility test means that the transformation which was determined in the description of confidence sets is studied. If the transformation is beyond a certain scope, the interpretation will be classified as implausible. Such scope may, for instance, determine how much the transformation is allowed to turn the character in relation to how much earlier interpreted characters have been turned. Also excessive deformations may be excluded. In order to distinguish, for example, "S" from "s", the enlargement of the transformation can be calculated in relation to the enlargement of symbols that have been interpreted before.

The above-described embodiments of the method according to the invention should only be seen as non-limiting examples, and many modifications apart from the above-mentioned ones are possible within the scope of the invention as defined in the appended claims. Examples of further such modifications follow below.

As an alternative to the above-described reparameterization, the decision is taken directly on the basis of the first determined smallest value of proximity measure.

Examples of other modifications are the choice of another proximity measure, various choices of values of acceptance limits that demand a certain adaptation to various users, different types of reparameterization and different types of shape, for instance, an affine shape.

As far as various types of shape are concerned, two or more shapes are, as an alternative, used in parallel for each union of characters. This means that several invariants are provided for each union of characters and are then processed in parallel in the following steps. This gives a higher degree of accuracy and a faster recognition.

In practice, the method according to the invention can be used, for instance, in electronic notebooks and the like and in mobile telephones with an enhanced possibility of communication by a writable window.

The method according to the invention can be implemented as a computer program in a computer by using a commercially available programming language for mathematical calculations, such as C, C++ or FORTRAN, or as a specially detected unions of characters are stored. By means of the processing unit, calculation operations are carried out, which comprise the interpretation of the sequences of points as one or more curves, the parameterization of each curve, the comparison of the preprocessed union of characters with template symbols and the application of the decision rule. In the memory unit 50, also software for carrying out the method is stored. The control unit 48 runs the program and communicates with the user via the display communication unit 44 and the display 42.

The device is also adapted for optional settings which, inter alia, may comprise the choice of shapes, the choice of proximity measure, the choice of parameterizations and the choice of decision rule. The choices are made via the display 42.

Above, the description has essentially been made on the basis of the characters being written on a display and being detected at the same time as they are written. An alternative is that the characters are detected, for instance scanned, as they are already written on a piece of paper. This concerns handwritten characters as well as typewritten ones. Thus, the detection comprises, instead of the operation of recognizing the display writing, the operation of reading (scanning) the characters on the piece of paper. Advantageously, read data is transformed into said ordered sequence of points by edge detection. However, it is also a modification within the scope of the invention. In this embodiment, the preprocessing comprises forming one or more characteristic curves, for instance the edge curve or edge curves of the character, on the basis of said edge detection and parameterization. When the edge curves thus have been defined, the following steps are the same as in the above-described, preferred embodiment.

The decision rule may be selected in many different ways. A variant of the above-mentioned is that all the template symbols for which the value of the proximity measure below the acceptance limit is selected. Subsequently, the template symbols may be processed further in accordance with any refined determination of the above-described type. It is also possible to make a combination with another selection method, which points out the most plausible alternative. One example of such a method is statistics of characters that indicate the probability of the presence of separate characters or compositions of characters in texts.

Moreover, an alternative for determining the acceptance limits is that the template symbols are grouped, in which case the same limit applies within a group.

The method according to the invention is reliable in that it is able to recognize rather deformed characters and manages running text. The contents of the database are not crucial, but in principle a set of separate characters is sufficient. In order to recognize a variety of fonts and handwritings with a high degree of accuracy, it may, however, be an advantage to store several variants of each character, which comprise deformations that are outside the class of transformation which is appropriate and permissible in the comparison. It may also be advantageous to store certain compositions of characters, for instance to be able to more safely distinguish two "l" "ll", which are connected, from "μ".

What is claimed is:

1. A method for character recognition comprising the steps of:
   detecting a union of characters,
   preprocessing the union of characters,
   comparing the preprocessed union of characters with one or more template symbols, and
   applying a decision rule in order to either reject a template symbol or decide that the template symbol is included in the union of characters, the step of preprocessing the union of characters comprising the steps of:
   representing the union of characters as one or more curves, and
   parameterizing said curve or curves, characterized in that the step of preprocessing the union of characters further comprises the step of forming, regarding various classes of transformations, one or more shapes for said curve or curves, wherein said one or more shapes for said curve or curves are defined as $$d(\phi)=\{\psi|\psi=g(\phi), g \in G\}$$

where $\phi$ is said parameterized curve, $d(\phi)$ is said shape for said curve, and $G$ is said class of transformations,
   said shape being invariant with respect to said class of transformations, and that the step of comparing comprises the steps of:
   forming one or more geometric proximity measures,
   determining for every shape the values of said geometric proximity measures between said shape and correspondingly determined shapes for the template symbols, and that the step of applying a decision rule comprises the step of:
   selecting one or more template symbols in consideration of said values.

2. A method as claimed in 1, characterized in that the step of detecting a union of characters comprises the step of representing the union of characters as a set of points, and that the step of representing the union of characters as one or more curves comprises the steps of:
   generating an ordered sequence of points from said set of points, and
   interpolating between the points to generate said one or more curves.

3. A method as claimed in claim 1, characterized in that the step of parameterizing comprises the steps of:
   arranging according to a convenient rule of parameterization a function which follows the curve, and
   sampling the function in a plurality of equidistant points.

4. A method as claimed in claim 3, characterized in that the rule of parameterization is an arc length.

5. A method as claimed in claim 1, the union of characters being detected on a display on which it is written directly, characterized in that the step of detecting is carried out during the writing.

6. A method as claimed in claim 1, characterized in that the union of characters is detected in a data quantity that originates from a scanner.

7. A method as claimed in claim 6, characterized in that the step of preprocessing the union of characters comprises edge detecting the union of characters.

8. A method as claimed in claim 1, characterized in that the step of applying a decision rule comprises determining acceptance limits of the values of said proximity measures and selecting a template symbol only if at least one value related to the template symbol is within said acceptance limits.

9. A method as claimed in claim 8, characterized in that individual; acceptance limits are assigned to each template symbol.

10. A method as claimed in claim 8, characterized in that at least two template symbols have the same acceptance limits.

11. A method as claimed in claim 8, characterized in that the step of reparameterizing a parameterized curve is all the values of said proximity measures between the shape of the parameterized curve and the template symbols are beyond the acceptance limits so that one or more values of the corresponding proximity measure decreases between the template symbols and the shape of the reparameterized curve.

12. A method as claimed in claim 8, characterized in that the acceptance limits are determined on the basis of the fact that only similarity transformations are permitted.

13. A method as claimed in claim 1, characterized in that the step of applying a decision rule comprises carrying out a plausibility test of the selected template symbols.

14. A method as claimed in claim 13, characterized in that the plausibility test is based on the confidence sets.

15. A method as claimed in claim 1, wherein the step of forming one or more shapes comprises forming, with regard to positive similarity transformations, a given shape for said curve or curves, such that said given shape is invariant with regard to all said positive similarity transformations.

16. A method as claimed in claim 15, wherein said given shape is given by $$s(\phi)=\text{linhull}\,(\{(\phi_1, \phi_2), (-\phi_2, \phi_1), (1, 0), (0, 1)\}$$

where $\phi$ is said parameterized curve or curves, and $\phi$ is parameterized in two parts $\phi_1$ and $\phi_2$ representing two coordinates of points on said curve or curves.

17. A method as claimed in claim 1, wherein the step of forming one or more shapes comprises forming, with regard to affine transformations, a given shape for said curve or curves, such that said given shape is invariant with regard to all affine transformations.

18. A method as claimed in claim 17, wherein said given shape is given by $$s(\phi)=\text{linhull}\,(\phi_1, \phi_2, 1)$$

where $\phi$ is said parameterized curve or curves, and $\phi$ is parameterized in two parts $\phi_1$ and $\phi_2$ representing two coordinates or points on said curve or curves.

19. A method as claimed in claim 1, wherein the step of forming one or more geometric proximity measures comprises selecting a scalar product that comprises derivatives of said curve or curves.

20. A method as claims in claim 1, wherein the step of forming one or more geometric proximity measures comprises selecting a scalar product that gives different weights to different parts of said curve or curves.

21. The method of claim 1, wherein said steps are applied to a signature for verification or identification of said signature.

* * * * *